Sept. 28, 1965   T. BUDZICH ETAL   3,208,473
PRESSURE RELIEF VALVE
Filed Oct. 15, 1962
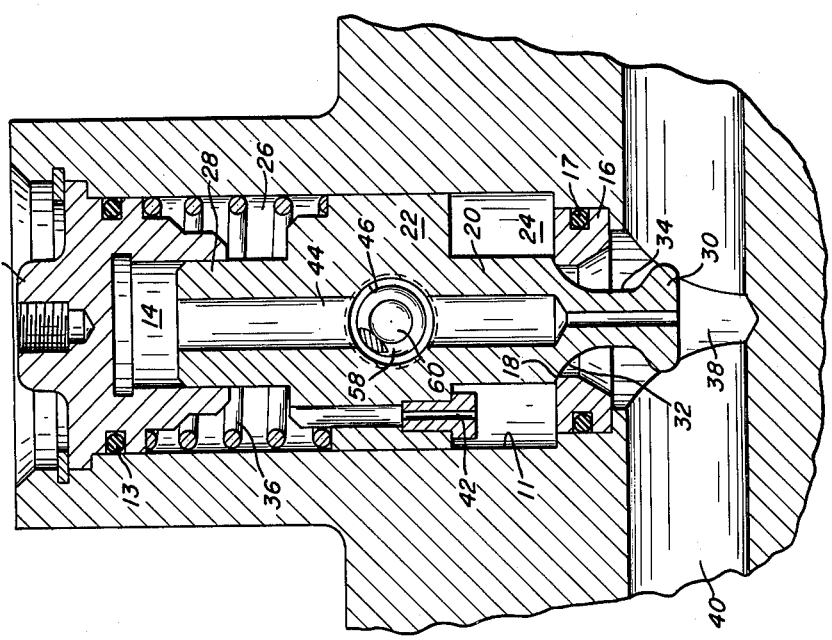
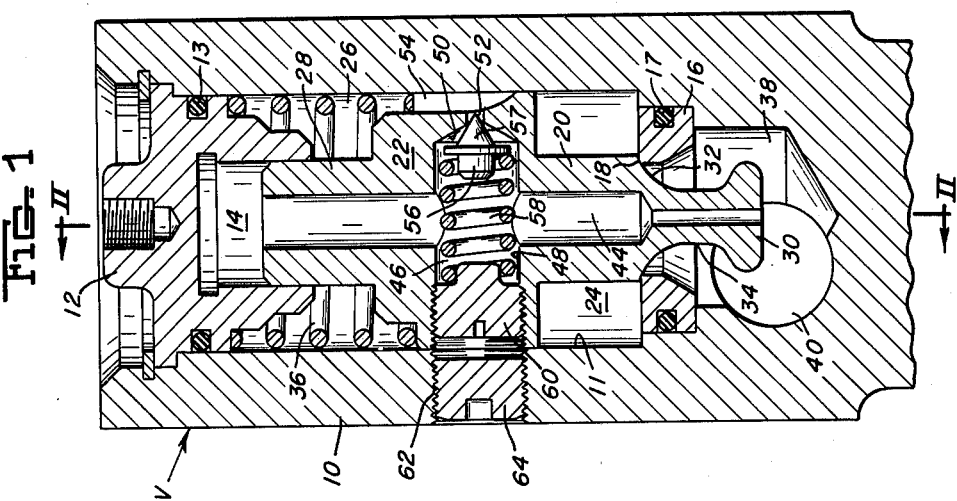
INVENTORS
TADEUSZ BUDZICH,
ARNOLD PITT
By Claire F. Mullen, Jr.
Attorney

United States Patent Office 3,208,473
Patented Sept. 28, 1965

3,208,473
PRESSURE RELIEF VALVE
Tadeusz Budzich, 3340 Colwyn Road, Cleveland, Ohio, and Arnold Pitt, 5 Hillgarden Road, Weston, Ontario, Canada
Filed Oct. 15, 1962, Ser. No. 230,761
3 Claims. (Cl. 137—490)

The present invention relates generally to relief valves and, in particular, to fluid pressure relief valves for the protection of hydraulic systems wherein fluid is contained under high pressure.

In hydraulic systems of all types in which the fluid pressure within the system may increase to a level sufficient to damage the equipment, it is customary to provide for pressure relief at a predetermined pressure level by means of relief valves or the like. Prior art relief valves capable of handling large volumes of fluid at high pressure have required extensive piping, particularly in the pilot circuit, to provide a sufficiently high rate of response. This not only requires that the equipment with which the valve is used be constructed to provide the relatively large space necessary to accommodate the valve, but this also weakens the valve body by the large number of drillings that must be made in it to accommodate the piping. Hence, strong and consequently expensive materials must be used in the construction of the valve housing.

It is, therefore, a principal object of this invention to provide a relief valve of simplified construction, capable of handling large-volume high-pressure flows of fluid in minimum space.

An additional object of this invention is to provide a relief valve capable of stable operation with a high rate of response.

Still a further object of this invention is to provide a relief valve in which the control poppet is mounted within the main poppet to minimize the required number of drillings and seals required.

Yet another object of this invention is the provision of a unitary relief valve having a high rate of response and stable operation with high volume, high pressure flow.

These and other objects will be apparent and a fuller understanding of the invention may be obtained by reference to the following description and drawings, in which:

FIGURE 1 is an elevation view in section of the relief valve of this invention; and FIGURE 2 is a sectional view taken substantially along line II—II of FIGURE 1.

With reference to the drawings, the relief valve, generally designated as V, is provided with a valve body or housing 10 having an interior cylindrical chamber 11. The chamber 11 is closed at one end by a cap 12 provided with a fluid tight O-ring seal 13 and having a cylindrical bore 14 therein, which is directed toward the interior of chamber 11. The other end of the chamber 11 is provided with a metallic sealing ring 16, sealed therein by an O-ring seal 17 and providing an annular sealing surface 18. A cylindrical main poppet 20 is slidably mounted within the chamber 11 and is provided with an enlarged cylindrical central portion 22 in engagement with the walls of chamber 11 and functionally dividing the chamber 11 into a first high-pressure fluid zone 24 adjacent to the open end of the chamber 11 and a second high pressure fluid zone 26 adjacent to the closed end of the chamber 11. The main poppet 20 is further provided with a cylindrical extension 28 that is in sliding sealing engagement with the cylindrical bore 14 of the cap 12. The poppet 20 also has an opposite extension 30 having a generally conical shaped surface 32 and terminating in a neck 34. The conical shaped surface 32 is normally urged into sealing engagement with the annular sealing surface 18 of sealing ring 16 by a biasing spring 36 mounted between the cap 12 and the enlarged cylindrical portion 22 of the main poppet 20. The area of the cross sectional surface of the cylindrical extension 28 and the area of the conical surface 32 of the cylindrical extension 30 are formed substantially equal for a purpose hereinafter described.

Immediately adjacent the conical surface 32 of the cylindrical extension 30 is a low pressure zone 38 that is normally isolated from the high pressure fluid zone 24 of the chamber 11 by the sealing engagement of the conical surface 32 and the sealing surface 18 of the sealing ring 16. The high-pressure zone 24 of chamber 11 receives high pressure fluid from the hydraulic circuit, constituting a high pressure fluid source being protected by the valve, through drilling 40. The high pressure fluid so received by the high-pressure zone 24 is introduced to the zone 26 through a throttling orifice 42 provided within the enlarged cylindrical portion 22 of the main poppet 20. The low pressure zone 38 communicates with the cylindrical bore 14 of the cap 12 by means of a longitudinal passage 44 provided within the main poppet 20. Since the areas of the cross sectional surface of the cylindrical extension 28 and the conical surface 32 of the cylindrical extension 30 are substantially equal, and since the fluid pressure in the high pressure fluid chambers 24 and 26 are equal, the main poppet 20 is maintained in hydraulic equilibrium with only the spring 36 urging the conical surface 32 into sealing engagement with the sealing surface 18.

As shown in FIGURE 1, the enlarged cylindrical portion 22 of the main poppet 20 is provided with a transverse cylindrical bore 46 intersecting the longitudinal passage 44 and having its longitudinal axis substantially normal to that of the passage 44. The bore 46 has a maximum diameter opening 48 at one end thereof with the other end forming a conical surface 50 terminating in a substantially smaller opening 52. The opening 52 communicates with high pressure zone 26 through relieved portion 54 provided in the enlarged cylindrical portion 22 of the main poppet 10. A pressure-responsive control poppet 56 is movably mounted within the bore 46. The control poppet 46 has a conical end 57 normally urged into sealing contact in opening 52 by a biasing spring 58 urging against plug 60 disposed in bore 46.

To provide for ready adjustment of the compression of biasing spring 58, the portion of the bore 46 between its junction with the longitudinal passage and its maximum diameter opening may be threaded to mate with threads chased on adjusting plug 60. Hence, the compression of the biasing spring 58 may be increased or decreased by merely threading the plug further into or out of the bore 46. Access may be had to the adjusting plug 60 by a threaded opening 62 provided in the housing 10 adjacent to the normal location of said adjusting plug. This opening may be normally sealed by a threaded plug 64.

In the operation of the valve, the zones 24 and 26 of the chamber 11 are filled with high pressure fluid. This high pressure fluid is normally isolated from the low pressure zone by the mating of cylindrical extension 28 and bore 14, sealing surface 18 and control poppet 56. Since the main poppet 20 is in hydraulic balance, as previously described, the spring 36 only maintains the large poppet in sealing engagement and consequently can be relatively small. The high pressure fluid in the high pressure zone 26 continuously exerts force on the control poppet and against the preload of spring 58 via the relieved portion 54. As long as this preload exceeds the opposed fluid force, the control poppet continues to seal the high pressure fluid from the low pressure zone. As previously explained, the spring 58 may be adjusted to vary the preload.

If the pressure of the fluid increases to a level at which the fluid force exceeds the preload on the control poppet spring 58 the poppet 46 will unseat and the high pressure fluid from the high pressure zone 26 will be metered into the low pressure zone via relieved portion 54, opening 52, bore 46, and passage 44. The fluid so removed from the zone 26 must be replaced by fluid from the high pressure zone 24. This replacement fluid can enter the high pressure zone 26 only by flowing through throttling orifice 42, and this flow can be induced only by the pressure drop between the zones 24 and 26, which is equivalent to the throttling losses in the orifice. Hence, the unseating of the control poppet, which causes fluid to leave the high pressure zone 26 and enter the low presure zone, creates a pressure differential between the high pressure zones 24 and 26, proportional to the amount of flow. This pressure differential acts upon the enlarged cylindrical portion 22 of the main poppet 20 to force the poppet 20 upwardly as seen in FIGURES 1 and 2 against the preload of the spring 36. If the preload is exceeded by this action, the main poppet is lifted to break the seal at sealing surface 18 and allow direct flow of the fluid from the high pressure zone 26 into the low pressure zone 38. This will cause the excess high pressure fluid to be diverted to the low pressure zone. This will lower the pressure in the high pressure zones 24 and 26 by an amount sufficient to permit the control poppet to seat. The fluid flow from the high pressure zone 26 to the low pressure zone will stop and the fluid pressure in the high pressure zone 24 and 26 will be equalized. When this condition is achieved, which provides a hydraulic balance to the poppet 20 as described above, the preload provided by spring 36 again urges the conical surface 32 of the main poppet into sealing engagement with the sealing surface 18 and the flow of fluid directly from the high pressure zones to the low pressure zone ceases.

It is readily apparent that a small quantity of fluid can be passed from high pressure zone 26 through orifice 42 to high pressure zone 24 through the relieved portion 54 and out through control poppet 56 to the low pressure zone without creating a pressure differential sufficient to unseat the main poppet.

Since the preload on the control poppet may be varied by adjusting the spring 58 in the manner previously described, the valve can be made to operate at any desired pressure level. In addition, since the main poppet is hydraulically balanced and the sealing force is provided solely by the spring bias, the valve will discharge large volumes of fluid at a minimum pressure increase above the preselected pressure level. Also, the accurate control of the fluid flow provided by the valve permits the maintenance of maximum fluid pressure in the hydraulic systems. Thus it can be seen from the foregoing that the spring controlling the action of the valve can be actuated through a very small opening irrespective of the volume flow through the valve and thus can be relatively small and compact.

While one embodiment of our invention has been shown and described it will be apparent that other adaptations and modifications may be made without departing from the scope of the following claims.

What is claimed is:

1. A relief valve interposed between a high pressure fluid source and a low pressure zone, comprising a housing having an open end and a closed end, said open end having a sealing surface therearound and said closed end having an internally directed cylindrical bore, therein, a first poppet slidably mounted within said housing, said first poppet having a first end portion adapted to mate with and reciprocate within said cylindrical bore, a second opposed end portion having a conical surface normally urged into sealing engagement with said sealing surface by a spring bias, an enlarged cylindrical portion intermediate said end portions and engaging said housing to divide it into an upper fluid chamber adjacent said closed end of said housing and a lower fluid chamber adjacent said open end of said housing, said cylindrical portion having a throttling orifice therein communicating with said upper and lower fluid chambers, a longitudinal passage within said first poppet and extending between said end portions, and a transverse bore extending from said longitudinal passage, through said cylindrical portion and terminating in an opening communicating with said upper fluid chamber, a second spring biased poppet slidably mounted within said transverse passage and normally closing said opening, means in said cylindrical portion for adjusting the biasing force of said spring biasing the second poppet, and access means in said housing to provide access to the means to adjust the biasing force of said spring of said second poppet when the first poppet is mounted in the housing.

2. The combination of claim 1 wherein said access means includes wall means defining an aperture in said housing.

3. The combination of claim 2 further characterized by closure means threadably engageable in said wall means to close said aperture.

References Cited by the Examiner

UNITED STATES PATENTS

| 2,388,820 | 11/45 | Bonnell | 137—491 |
| 2,601,870 | 7/52 | Lee | 137—490 |
| 2,619,112 | 11/52 | Renick | 137—490 |
| 3,129,720 | 4/64 | Allen et al. | 137—490 |

FOREIGN PATENTS

| 1,251,906 | 12/60 | France. |
| 865,419 | 4/61 | Great Britain. |

M. CARY NELSON, *Primary Examiner.*

MARTIN P. SCHWADRON, *Examiner.*